United States Patent [19]
Mark

[11] Patent Number: 5,828,190
[45] Date of Patent: Oct. 27, 1998

[54] G1 HIGH FREQUENCY DRIVE FOR COLOR CATHODE RAY TUBES

[75] Inventor: William J. Mark, Glenview, Ill.

[73] Assignee: Zenith Electronics Corporation, Glenview, Ill.

[21] Appl. No.: 857,082

[22] Filed: May 15, 1997

[51] Int. Cl.⁶ .................................................. H01J 29/52
[52] U.S. Cl. .......................................... 315/381; 315/383
[58] Field of Search ................................. 315/381, 383

[56] References Cited

U.S. PATENT DOCUMENTS

| | | |
|---|---|---|
| 2,280,670 | 4/1942 | Spielman . |
| 4,075,485 | 2/1978 | Lijewski et al. . |
| 4,763,046 | 8/1988 | Sheikholeslami et al. ............. 315/381 |
| 5,498,996 | 3/1996 | Frankland ............................... 330/118 |
| 5,677,730 | 10/1997 | Park ....................................... 348/173 |

*Primary Examiner*—Theodore M. Blum

[57] ABSTRACT

The frequency roll-off experienced by video signals applied to the three cathodes of a color cathode ray tube, due to the capacitance between the cathodes and the common control grid, is compensated with a single inductor connected in series with the common control grid.

4 Claims, 1 Drawing Sheet

G1 HIGH FREQUENCY DRIVE FOR COLOR CATHODE RAY TUBES

BACKGROUND OF THE INVENTION AND PRIOR ART

This invention relates to cathode-driven color cathode ray tubes (CRTs). In particular it concerns decreasing the high frequency roll-off experienced by applied video signals due to the capacitance between the individual cathodes and the common control grid of the CRT.

The problem of roll-off in frequency in CRTs is not new. A known technique for reducing such frequency roll-off involves adding an inductor between each of the video amplifier outputs and the respective cathodes of the CRT. That approach requires three inductors as well as the additional printed circuit board space for mounting and connecting the inductors.

The present invention uses a single inductor in the common G1 control grid drive circuit to compensate for the roll-off in frequency of the video signals and achieves performance that is equivalent to the above discussed prior art circuit without the added component cost and additional printed circuit board space requirement.

OBJECTS OF THE INVENTION

A principal object of the invention is to provide a novel color CRT drive circuit.

Another object of the invention is to provide a cost and space effective drive circuit with reduced frequency roll-off for a color CRT.

BRIEF DESCRIPTION OF THE DRAWINGS

These and other objects and advantages of the invention will be apparent upon reading the following description thereof in conjunction with the drawings, in which.

DESCRIPTION OF THE PREFERRED EMBODIMENT

Figure 1:
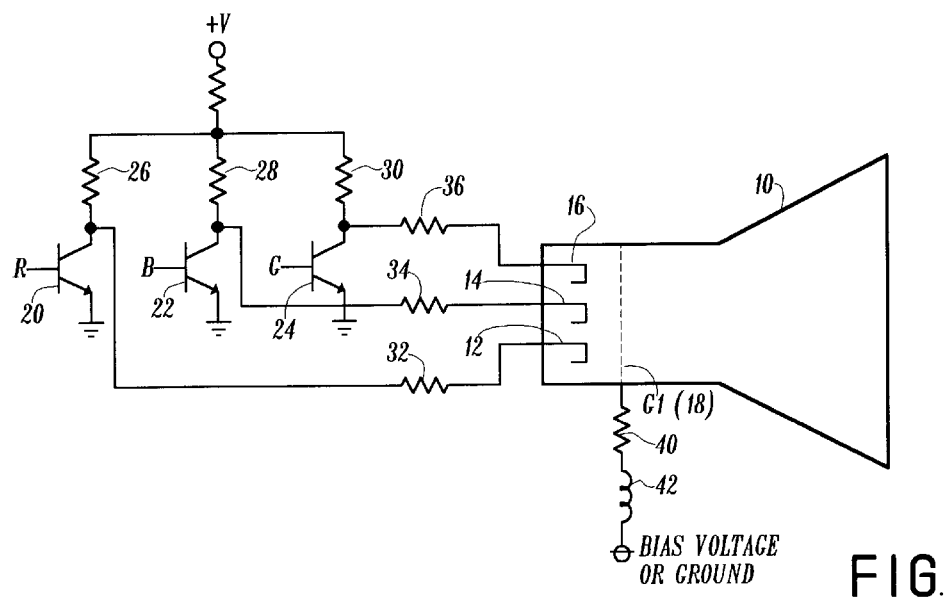
FIG. 1 is a simplified block diagram of the drive circuit of the invention.

With reference to FIG. 1, a color CRT 10 includes three cathodes 12, 14 and 16 and a common G1 control grid 18. The cathodes are supplied with red (R), blue (B) and green (G) video signals from respective video amplifiers, shown here as a red video amplifier transistor 20, a blue video amplifier transistor 22 and a green video amplifier transistor 24. The collectors of transistors 20, 22 and 24 are supplied from a source of +V voltage through respective load resistors 26, 28 and 30. The collectors of transistors 20, 22 and 24 are connected to cathodes 12, 14 and 16 by individual resistors 32, 34 and 36, respectively. The G1 control grid 18 is biased by being connected to a source of DC bias voltage (or ground) that is coupled through a resistor 40 and an inductor 42. Those skilled in the art will appreciate that the value and polarity of the bias voltage is a function of the characteristics of the particular CRT that is used.

The video signals supplied to the respective bases of video amplifier transistors 20, 22 and 24 have a range of frequencies of 4.0 MHz or more and consequently experience substantial roll-off with increasing signal frequency as a result of the capacitance that exists between cathodes 12, 14 and 16 and common G1 control grid 18. As mentioned above, in the prior art, individual inductors were inserted between the collectors of the video amplifier transistors and the cathodes to compensate for this high frequency roll-off. In the circuit of the invention, the individual inductors are replaced by a common inductor 42 that is connected in the common G1 control grid drive circuit. The effect on high frequency video signal roll-off with the common inductor of the invention is substantially the same as with the individual inductors of the prior art circuit, but with less cost and reduced printed circuit board space requirements.

Figure 2:
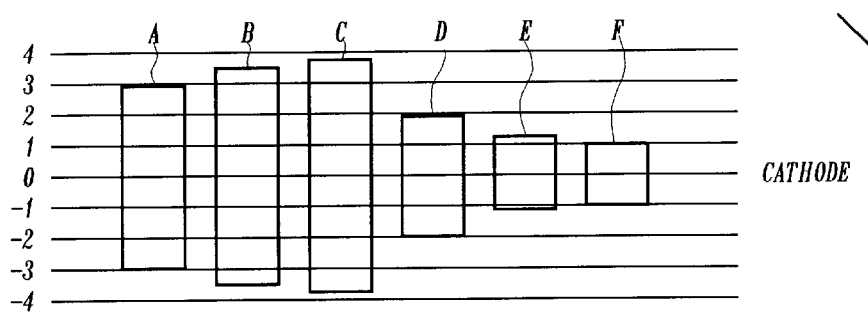
FIG. 2 shows a series of waveforms illustrating the effects of the invention.
Figure 2:
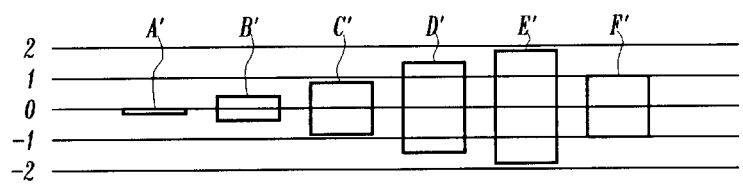
Figure 2:
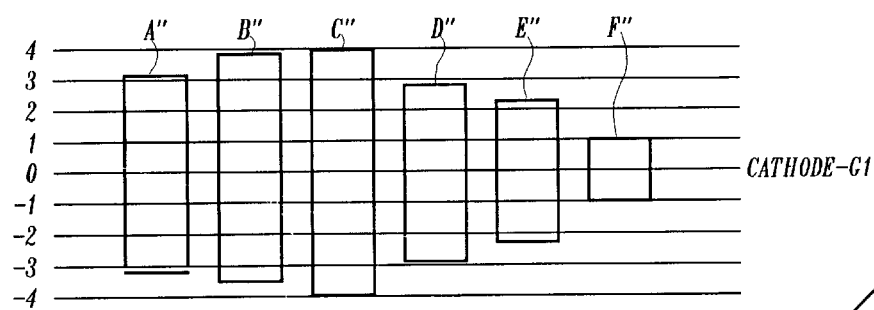

The curves in FIG. 2 generally indicate the waveform amplitudes that result from application of a conventional color burst signal to the video amplifiers, as measured from cathode to G1, from G1 to ground and from cathode to ground. The cathode to ground signal amplitude is effectively the cathode voltage less the G1 voltage since the cathode and G1 voltages are out of phase. The outlines of the waveform amplitudes are labelled A, B, C, D, E and F (and A' . . . F' and A" . . . F") and correspond to signals of 0.5, 1.0, 2.0. 3.0, 3.5 and 4.0 MHz, respectively. As is apparent, the amplitudes of the higher frequency cathode signals are augmented by the corresponding signals on G1 such that the cathode signal amplitudes less the G1 amplitudes are significantly larger than the amplitude of the cathode signals alone. Thus the high frequency video signal roll-off of the cathode signals has been offset to a large extent by the signal developed across the G1 control grid. While the degree of offset is no greater than that produced by the prior art circuits, it has been accomplished in the inventive circuit with a single inductor in the G1 control grid drive circuit.

What has been described is a novel video drive arrangement for a color cathode ray tube. It is recognized that numerous modifications in the described embodiment of the invention will occur to those skilled in the art without departing from its true spirit and scope. The invention is to be limited only as defined in the claims.

What is claimed is:

1. In combination:
    a cathode ray tube having a plurality of cathodes and a common control grid;
    a corresponding plurality of video amplifiers for supplying video frequency signals to respective ones of said cathodes; and
    an inductor coupled to said common control grid for compensating for the roll-off in frequency experienced by said video signals due to the capacitance between said cathodes and said common control grid.

2. The combination of claim 1, wherein each of said video amplifiers has an output circuit that includes a respective one of said cathodes and a series-connected resistor.

3. The combination of claim 2, wherein said common control grid is DC biased and includes a resistor in series with said inductor.

4. A video circuit comprising:
    a color cathode ray tube including three cathodes and a common control grid;
    three video amplifiers having individual outputs connected to respective ones of said cathodes via series-connected resistors; and
    an inductor connected to said common control grid for compensating for the frequency roll-off experienced by video signals in said outputs due to the capacitance between said cathodes and said common control grid.

* * * * *